United States Patent
Borglum

(12) 
(10) Patent No.: US 6,499,258 B1
(45) Date of Patent: Dec. 31, 2002

(54) STABILIZING JACK SYSTEM FOR PORTABLE BLEACHER

(76) Inventor: Keith Borglum, 218 Loma St., Waterloo, IA (US) 50701

( * ) Notice: Subject to any disclaimer, the term of this patent is extended or adjusted under 35 U.S.C. 154(b) by 0 days.

(21) Appl. No.: 09/750,728

(22) Filed: Dec. 28, 2000

(51) Int. Cl.⁷ ................................................. E04H 3/12
(52) U.S. Cl. ................. 52/9; 52/7; 52/126.1; 52/126.6; 52/143; 52/741.1; 254/418; 254/419; 280/763.1
(58) Field of Search .............................. 52/7, 9, 126.1, 52/126.5, 126.6, 143, DIG. 11, 741.1; 296/64; 254/418, 419, 420, 424, 93 VA; 280/763.1, 764.1, 765.1, 766.1

(56) References Cited

U.S. PATENT DOCUMENTS

| | | | | |
|---|---|---|---|---|
| 1,303,854 A | * | 5/1919 | Clark | 248/352 X |
| 2,587,159 A | * | 2/1952 | Holmes | 52/9 |
| 2,776,148 A | * | 1/1957 | Geerds | 280/766.1 |
| 3,253,839 A | * | 5/1966 | Warren | 254/419 |
| 3,786,951 A | * | 1/1974 | Ruff et al. | 52/143 X |
| 3,789,558 A | * | 2/1974 | Spencer et al. | 52/143 |
| 3,885,827 A | * | 5/1975 | Sanders | 296/64 |
| 4,412,403 A | * | 11/1983 | LeFranc et al. | 52/9 |
| 4,466,637 A | * | 8/1984 | Nelson | 280/766.1 |
| 4,611,439 A | * | 9/1986 | Graham, Jr. | 52/9 |
| 5,947,502 A | * | 9/1999 | Kammerzell et al. | 280/442 |
| 6,099,016 A | * | 8/2000 | Peveler | 280/475 |

FOREIGN PATENT DOCUMENTS

FR      2599074    * 11/1987 ........................ 52/9

* cited by examiner

Primary Examiner—Carl D. Friedman
Assistant Examiner—Brian E. Glessner
(74) Attorney, Agent, or Firm—Andrus, Sceales, Starke & Sawall

(57) ABSTRACT

A portable bleacher construction includes a wheeled framework for supporting a plurality of bleacher seats thereon in a mobile travel condition and a stationary seating condition. At least one pair of leveling jacks is located on opposite sides of the framework for stabilizing and leveling the framework upon a ground surface when the portable bleacher construction is in the stationary seating condition. The jacks are arranged to provide a four-point stance for the framework, and have a high sway load capacity to provide lateral stability. A control arrangement is associated with one of the jacks in each pair for separately controlling the leveling of both of the jacks. The control arrangement is located on one side of the bleacher construction, and enables operation of leveling jacks on both sides. The control arrangement includes a pair of transfer rods and a separate operating handle interconnected with each transfer rod. One of the transfer rods provides an input to the jack with which the control arrangement is associated, and the other transfer rod extends across the bleacher construction and provides an input to the opposite jack.

8 Claims, 3 Drawing Sheets

STABILIZING JACK SYSTEM FOR PORTABLE BLEACHER

FIELD OF THE INVENTION

This invention relates broadly to a portable bleacher construction and, more particularly, pertains to a jack system for leveling and stabilizing a portable bleacher in a stationary position upon a ground surface.

BACKGROUND AND SUMMARY OF THE INVENTION

There are various instances where events, particularly outdoor events, are to be staged which require the availability of seating for a viewing audience. Permanent seating, such as bleachers, can be constructed for events which are always held in the same place. For one-time events or less frequent events, temporary seating such as portable bleachers can be employed. Portable bleachers can also be used to supplement existing permanent seating to increase seating capacity, if desired, for certain events. One of the characteristics of such portable seating is that the mobile framework carrying the seating must be stabilized and leveled on ground surfaces which are frequently uneven and vary from site to site.

Portable bleacher constructions are known in which one section of seating is permanently fixed to a wheeled framework and at least one other section of seating is pivotally mounted thereto. Hydraulic cylinders or other mechanical devices are often used to pivot the movable section between a nested, travel position and an operative, seating position. In order to stabilize and level the bleacher construction prior to use, it has been the practice to install a plurality (i.e. 10–14) of individually operated jacks along the framework. Typically, the jacks are installed such that a series of jacks are located on each side of the framework. In operation, the operator must swivel each jack down from a storage mode, and then each jack must be manually cranked from a squatting or kneeling position to adjust for the particular terrain, to stabilize and level the portable bleacher. This necessitates that an operator will expend a great deal of time and energy adjusting the jacks on each side of the framework.

Accordingly, it would be desirable to markedly reduce the labor-intensive efforts required in deploying and individually adjusting the jacks employed in a portable seating arrangement. It would also be desirable to shorten the time needed to efficiently effect leveling of the mobile framework supporting the portable seating.

It is one object of the present invention to provide a portable bleacher construction equipped with a stabilizing jack system in which an operator can control the deployment and operation of the jacks to stabilize and level the portable bleacher construction with a minimum of time and effort.

It is also an object of the present invention to provide a portable bleacher framework with at least one pair of leveling jacks on opposite sides of the framework such that a control arrangement on one side of the framework is employed to independently adjust the positioning of both jacks.

It is a further object of the present invention to provide a stabilizing jack system for a portable bleacher in which a plurality of jacks disposed on each side of the portable bleacher framework may be operated in a standing position from one side of the framework.

In one aspect of the invention, a portable bleacher construction includes a wheeled framework for supporting a plurality of bleacher seats thereon in a mobile travel condition and a stationary seating condition. At least one pair of leveling jacks is located on opposite sides of the framework for stabilizing the framework in the seating position upon a ground surface. The invention contemplates a small number of high-capacity jacks in selected locations on the framework, to provide ease of operation and to increase stability to the portable bleacher construction. In a preferred form, four jacks are mounted to the framework to provide a stable stance, and each jack has a high sway load capacity to provide a high degree of lateral stability. In a particularly preferred form, a control arrangement is located on one side of the framework for separately controlling the deployment and leveling of both jacks in each pair of jacks. The framework includes a pair of parallel, spaced longitudinal beams interconnected by a pair of transverse end beams. A pair of wheel assemblies are located one on each of the longitudinal beams between the transverse end beams. Each jack is mounted to one of the longitudinal beams. Each jack has an upper tubular member affixed to one of the beams, and a lower tubular member with a ground engaging foot telescopically received and movably mounted in the upper tubular member for upward and downward movement relative thereto. The control arrangement is preferably interconnected with one of the jacks in each pair, and is located on a rear one of the longitudinal beams.

In one form, the control arrangement includes a first rotatable crank assembly and a second rotatable crank assembly movably mounted on an upper end of the upper tubular member of the jack disposed on the rear longitudinal beam. Each crank assembly is operably interconnected with one of the jacks, and the crank assemblies are operable to move the lower tubular members of the jacks on opposite sides of the framework upwardly and downwardly independent of each other. The first rotatable crank assembly has a first S-shaped handle pivotally mounted to a shortened transfer rod projecting into the upper end of the upper tubular member of the jack disposed on the rear longitudinal beam. The second rotatable crank assembly has a second S-shaped handle pivotally mounted to an elongated transfer rod extending from the jack on the rear longitudinal beam to the jack on the front longitudinal beam. The upper tubular member of the jack on the rear longitudinal beam includes clamp structure adapted for engagement with the first handle and the second handle for selectively retaining the first handle and the second handle in an inoperative position when not in use. The first handle and the second handle are disengaged from the clamp structure and pivoted upwardly on their respective transfer rods to an operative position, after which the handles are separately rotated to turn the transfer rods and operate the jacks, to effect movement of the lower tubular members against the ground surface. In a preferred form, at least one pair of jacks is located between the wheel assemblies and one of the transverse end beams, and another pair of jacks is located between the wheel assemblies and the other of the transverse end beams.

The invention also contemplates a portable bleacher construction having a mobile framework for supporting a plurality of bleacher seats thereon, and a plurality of pairs of leveling jacks located on opposite front and rear sides of the framework for stabilizing the framework on a ground surface when the framework is stationary. The invention includes a control station commonly located on each jack position on one side of the framework for allowing independent adjustment of each pair of jacks on the front and rear sides of the framework. The control station includes a pair of side-by-side, manual crank assemblies disposed upon an upper end of each jack positioned on one side of the framework. Each of the manual crank assemblies has a handle which is pivotable about a first horizontal axis extending generally parallel to the longitudinal axis of the framework, and is rotatable about a second horizontal axis extending generally perpendicularly to the first horizontal axis. The control station is preferably located on the rear side of the framework.

Various other objects, features and advantages of the invention will be made apparent from the following description taken together with the drawings.

BRIEF DESCRIPTION OF THE DRAWINGS

The drawings illustrate the best mode presently contemplated of carrying out the invention.

In the drawings.

DETAILED DESCRIPTION OF THE INVENTION

Figure 1:
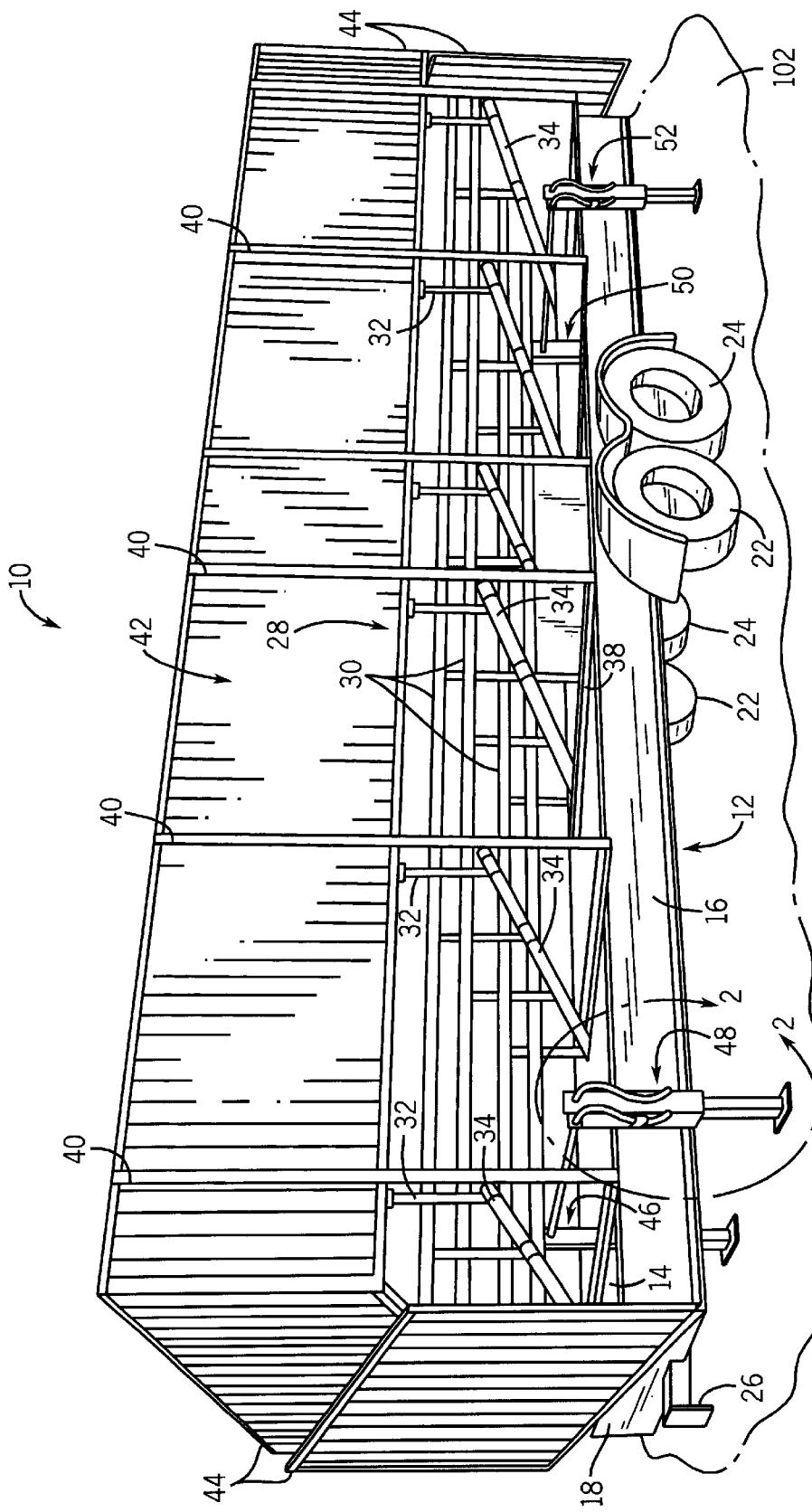
FIG. 1 is a rear isometric view of a portable bleacher construction having a stabilizing jack system embodying the present invention.

Referring now to the drawings, a portable bleacher construction 10, as seen from the rear, has a mobile framework 12 comprised of a pair of parallel, front and rear longitudinal beams 14, 16, respectively, interconnected by a pair of transverse end beams (one of which is seen at 18). A multiplicity of parallel, transverse intermediate beams (one beam being seen at 20 in FIGS. 3 and 4,) extends between the front and rear longitudinal beams 14, 16. The mobile framework 12 includes a pair of tandem wheel assemblies 22, 24 outside each of the front and rear longitudinal beams 14, 16. A tongue 26 is provided on one transverse end beam 18 to permit the framework 12 to be connected to a tractor vehicle (not shown) such as an automobile, truck, van or tractor so that the framework 12 can be moved in a direction parallel to its length or longitudinal axis.

Figure 4:
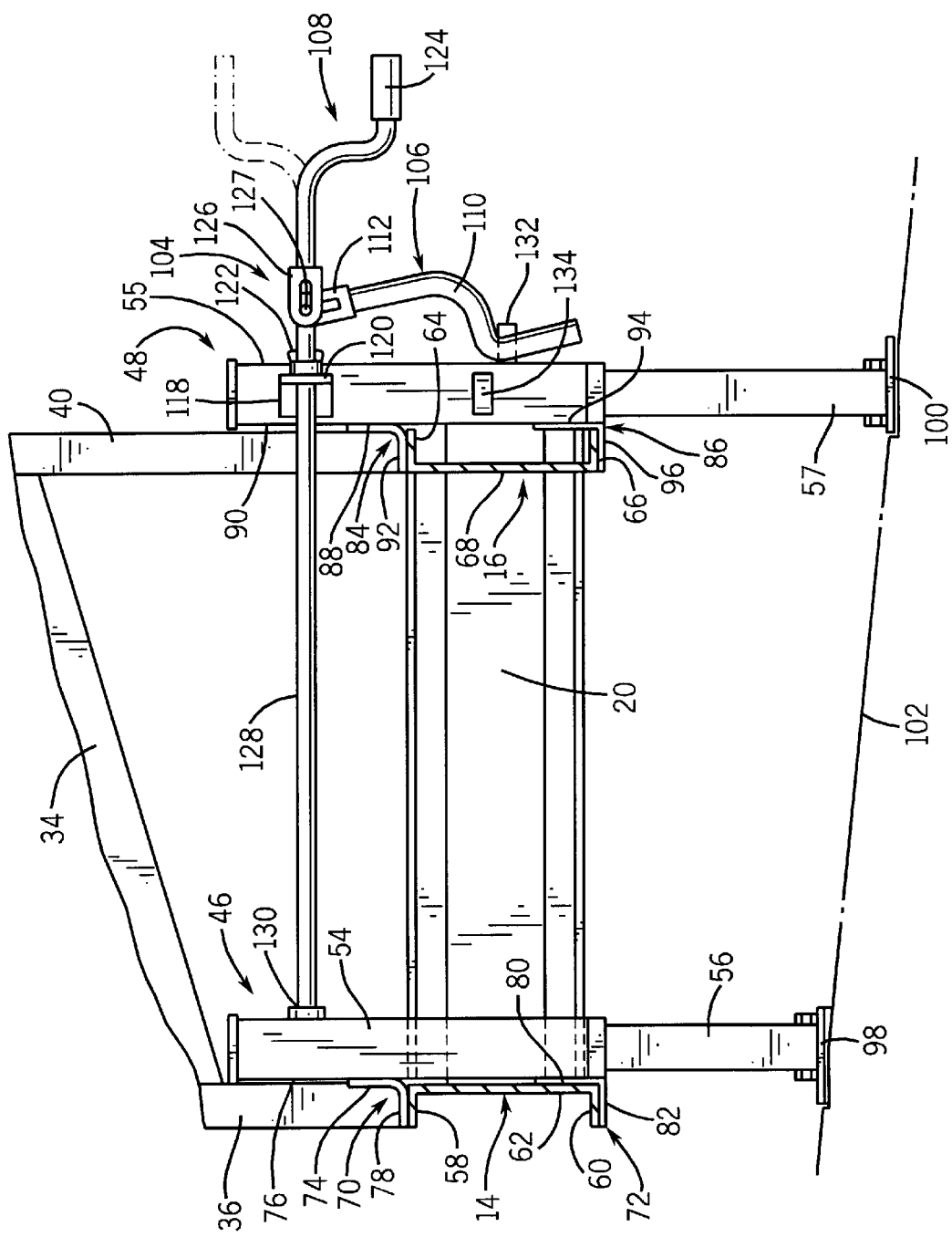
FIG. 4 is a partial sectional view taken on line 4—4 of FIG. 3.

Framework 12 carries a lower, fixed bleacher section 28 to which an upper movable bleacher section (not shown) is pivotally mounted in a manner as is well known. Normally, the movable bleacher section is carried in a nested position when the framework 12 is in a mobile travel condition, and is pivoted into an operative seating position when the framework 12 is stationary. Fixed bleacher section 28 includes a series of horizontal seating stringers 30 which extend along the length of the framework 12. Depending from the seating stringers 30 is a set of vertical support posts 32 which are joined at their lower ends to a number of angled support members 34. The lower, front end of the support members 34 terminate at a vertical front support member 36 (FIG. 4). A group of horizontal tubular braces 38 extend across the top of the front and rear longitudinal beams 14, 16. A rear end of each horizontal brace 38 is connected to a rear support post 40 which projects vertically from the rear of framework 12. A fence-like railing 42 is secured to the rear support posts 40 and extends above the top seating stringer 30 to provide a guard and backrest for persons seated at the top row of fixed bleacher section 28. Fence-like railings 44, which include a stationary upper section and a movable lower section, are provided on each end of the framework 12, to provide a guard for the ends of portable bleacher construction 10.

To support portable bleacher construction 10 in use, portable bleacher construction 10 includes a first pair of corresponding leveling jacks 46, 48 and a second pair of corresponding leveling jacks 50, 52 mounted to framework 12. Jacks 46–52 are of heavy duty construction, and function to relieve the load on wheel assemblies 22, 24. In one form, jacks 46–52 may be such as are typically employed for semi-trailer landing gear. The four jacks 46–52 provide a stable four-point stance, and have a high sway load capacity to provide lateral stability.

Figure 2:
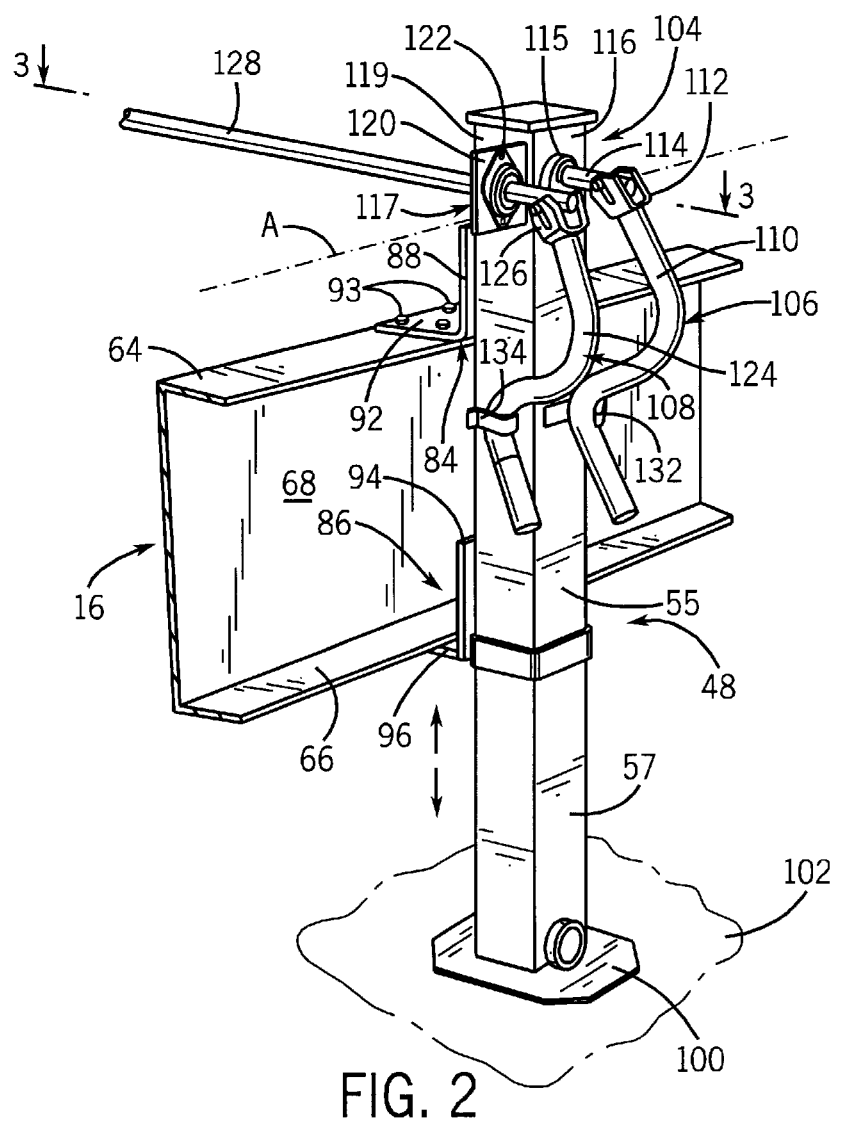
FIG. 2 is an enlarged, detailed partial isometric view of one of the stabilizing jacks incorporated in the portable bleacher construction, with reference to line 2—2 of FIG. 1.

Jacks 46, 48 are disposed on opposed front and rear longitudinal beams 14, 16, respectively, at a location between transverse end beam 18 and wheel assemblies 22, 24. Jacks 50, 52 are disposed on front and rear longitudinal beams 14, 16, respectively, at a location between the other transverse end beam (opposite end beam 18) and wheel assemblies 22, 24. Jacks 46, 48, as seen in FIG. 2, include respective upper tubular members 54, 55 and lower tubular members 56, 57 telescopically received and slidably mounted for upward and downward movement in the upper tubular members 54, 55. In the following description, only the details of jacks 46, 48, are set forth, it being understood that the structure and function of jacks 50, 52 is identical. Although not shown, each jack 46, 48, 50, 52 has a conventional internal mechanism, such as a rack and pinion or the like, which allows a rotational force imparted to an operating member to be transferred into linear vertical movement of the lower tubular members such as 56, 57, relative to their respective upper tubular members such as 54, 55.

Referring to FIGS. 2 and 4, each of the front and rear longitudinal beams 14, 16 is a rigid load bearing member which may be C-shaped in cross section, or which may have any other shape, in a manner as is known. Front longitudinal beam 14 includes an upper flange 58 and a lower flange 60 interconnected by a web 62. Rear longitudinal beam 16 has an upper flange 64 and a lower flange 66 joined by a web 68. Jack 46 is installed inwardly of front longitudinal beam 14 and front vertical support member 36. Jack 48 is mounted outwardly of rear longitudinal beam 16 and rear support posts 40.

Upper tubular member 54 of jack 46 is fixedly connected to front longitudinal beam 14 by a pair of upper and lower angle brackets 70, 72, respectively. Upper bracket 70 has a vertical leg 74 secured to an upper portion of a sidewall 76 of upper tubular member 54, and a horizontal leg 78 fixed, such as by a series of fasteners 79 (FIG. 3), to the top of upper flange 58 of front longitudinal beam 14. Lower bracket 72 has a vertical leg 80 attached to a lower portion of sidewall 76 of upper tubular member 54, and a horizontal leg 82 fixed to the bottom of lower flange 60 of front longitudinal beam 14.

In a similar manner, upper tubular member 55 of jack 48 is anchored to rear longitudinal beam 16 by a pair of angle brackets 84, 86, respectively. Upper bracket 84 has a vertical leg 88 secured to an upper portion of a sidewall 90 of upper tubular member 55, and a horizontal leg 92 fixed, such as by a series of fasteners 93, to the top of upper flange 64 of rear longitudinal beam 16. Lower bracket 86 has a vertical leg 94 attached to a lower portion of sidewall 90 of upper tubular member 55, and a horizontal leg 96 attached to the bottom of lower flange 66 of rear longitudinal beam 16.

Each of the lower tubular members 56, 57 has a cross section which is smaller than that of respective upper tubular members 54, 55 so as to enable the sliding relationship therebetween. In addition, each of the lower tubular members 56, 57 has a suitable length such that respective feet 98, 100 at the lower end thereof will be engageable with the ground surface 102, which is shown as being uneven in FIG. 4.

In accordance with the invention, there is a control station or arrangement 104 on each jack 48, 52 positioned on one side of the framework 12 for allowing independent adjustment and leveling of each corresponding pair of jacks 46, 48 and 50, 52 on the respective front and rear beams 14, 16 of the framework 12. Because each control arrangement 104 on jacks 48, 52 is identical, only the control arrangement 104 on jack 48 (as shown in FIG. 2) will be described.

Control arrangement 104 includes a first rotatable crank assembly 106 and a second rotatable crank assembly 108 movably mounted in side-by-side relationship on the upper end of the upper tubular member 55 for moving the lower tubular members 56, 57 on opposite sides of the framework 12 upwardly and downwardly separately from each other. The first rotatable crank assembly 106 has a first S-shaped handle 110 with a slotted, bifurcated upper end 112 pivotally mounted to a transverse pin 113 (FIG. 3) mounted to an outer end of a shortened, rotatable transfer rod 114. The rod 114 projects through a bearing collar 115 on sidewall 116 and projects into the interior of upper tubular member 55 where it is operably connected to a suitable internal mechanism, such as the drive pinion of a rack and pinion mechanism, for raising and lowering the lower tubular member 57.

An L-shaped bracket 117 is connected to the upper end of the upper tubular member 55. Bracket 117 has an attachment flange 118 anchored to sidewall 119 in any satisfactory manner, such as by welding, and an apertured support flange 120 which carries a bearing collar 122. The second rotatable crank assembly 108 has a second S-shaped handle 124 with a slotted, bifurcated end 126 pivotally secured to a transverse pin 127 mounted to an outer end of an elongated, rotatable transfer rod 128. The rod 128 passes through the bearing collar 122 and support flange 120 and extends across the width of framework 12 through another bearing collar 130 on upper tubular member 54 of corresponding jack 46. The end of rod 128 projects into the interior of upper tubular member 54 where it is operably connected to a suitable internal mechanism, such as the drive pinion of a rack and pinion mechanism, for raising and lowering lower tubular member 56. Control arrangement 104 includes a pair of spring-type clamp retainers 132, 134 mounted to upper tubular member 55 for retaining the handles 110, 124, respectively, in an inoperative position against adjacent sidewalls 116, 119.

In use, when portable bleacher construction 10 is placed in a stationary position in preparation for use, as shown in FIG. 1, the framework 12 must be stabilized and leveled relative to the prevailing ground surface 102. Jacks 46–52 are in a retracted position during transport, in which lower tubular members 56, 57 are fully retracted into respective upper tubular members 54, 55, and are extended in order to stabilize and level framework 12. To extend jacks 46–52, an operator successively disengages the handles 110, from respective clamp retainers 132, 134, pivots the particular handle 110 or 124 upwardly about horizontal axis A and then rotates the handle to rotate the transfer rod 114 or 128 to extend the lower tubular members 56 or 57 into engagement with the ground 102. This procedure is carried out for both pairs of jacks 46, 48 and 50, 52, as necessary to extend all jacks 46–52 into engagement with the ground and to then adjust jacks 46–52 as necessary to level framework 12.

Figure 3:
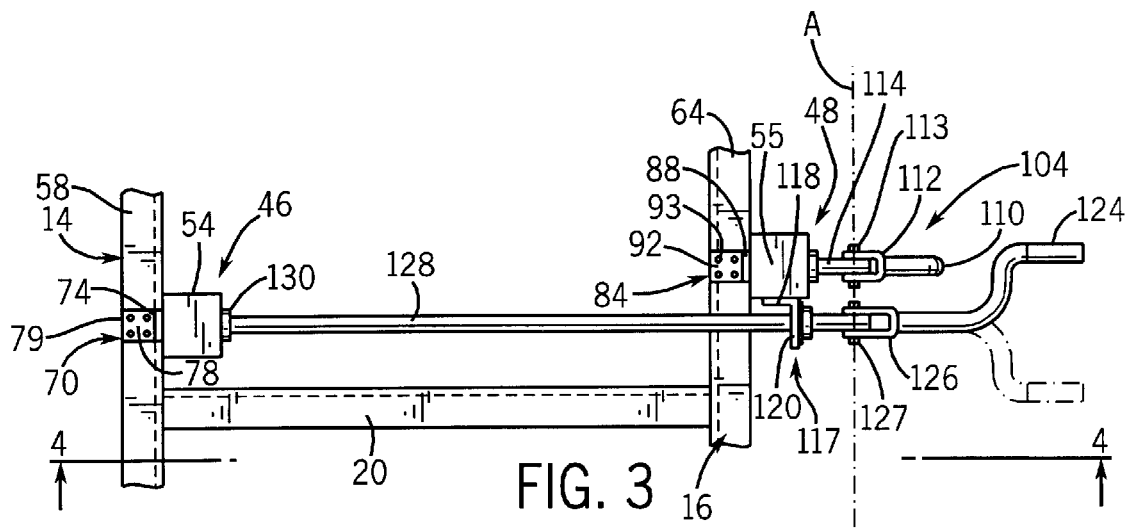
FIG. 3 is a partial top view taken on line 3—3 of FIG. 2.

FIGS. 3 and 4 illustrate the procedure for independently controlling jack 46 on front longitudinal beam 14. After handle 124 is pivoted on horizontal axis A, it is rotated to turn the elongated transfer rod 128 about the longitudinal axis of rod 128, which is generally perpendicular to the first horizontal axis A. Turning of rod 128 causes the internal mechanism of jack 46 to extend and retract lower tubular member 56. When jack 46 is suitably adjusted, the operator pivots handle 124 downwardly about horizontal axis A and handle 124 is reengaged with clamp retainer 134. As a feature of the invention, the operator, without having to change location, disengages handle 110 and performs a similar operation to adjust the jack 48 on rear longitudinal beam 16. Handle 110 is then reengaged with clamp retainer 132 and the operator simply moves along the rear longitudinal beam 16 until he reaches the jack 52. Again, the handles 110, 124 on jack 52 are separately manipulated as described above to independently adjust the lower tubular members of jacks 50, 52. This procedure is repeated as necessary until framework 12 is completely stabilized and leveled.

While jacks 46–52 are illustrated and described as manually operated telescoping type jacks, it is understood that any type of jack may be employed, including (but not limited to) hydraulic jacks, electric jacks, screw-type jacks, scissors-type jacks, etc.

It should thus be appreciated that the control arrangements 104 permit efficient stabilization and leveling of the portable bleacher construction 10 with a minimum of time and effort. The operator is able to operate jacks 46–52 to level the mobile load upon variable ground surfaces from one side only (preferably the rear) of the framework 12. Control arrangements 104 are constructed and arranged so as to be easily manipulated by an operator in a comfortable standing position. In addition, the use of four jacks, each of which is located at one corner of framework 12, ensures that each jack is in engagement with the ground and carries its share of the load of bleacher construction 10. In the prior art arrangement, adjustment of one of the series of jacks mounted to each beam 14, 16 could alleviate the load on others of the jacks, making it difficult to ensure engagement of all jacks while maintaining a level attitude of bleacher construction 10.

Control stations or arrangements 104 have been shown and described as being located on jacks 48, 52 at the rear of portable bleacher construction 10. It is understood, however, that control stations or arrangements 104 may also be located at the front of portable bleacher construction 10, or one at the front and one at the rear. It is preferred, however, to provide both control stations or arrangements 104 on the same side, to facilitate quick and easy operation of jacks 46–52.

In addition, while the invention has been shown and described with respect to two pairs of jacks, it is understood that additional jacks or pairs of jacks may be employed between those jacks which define the four-point stance, as necessary according to length spans or load requirements.

While the invention has been described with reference to a preferred embodiment, those skilled in the art will appreciate that certain substitutions, alterations and omissions may be made without departing from the spirit thereof.

Accordingly, the foregoing description is meant to be exemplary only, and should not be deemed limitative on the scope of the invention as set forth in the following claims.

I claim:

1. A portable bleacher construction comprising:
    a wheeled framework for supporting a plurality of bleacher seats thereon in a mobile travel condition and a stationary seating condition;
    at least one pair of leveling jacks located on opposite sides of the framework for stabilizing the framework in the seating condition upon a ground surface, wherein each of the jacks has an upper tubular member fixed to the framework, and a lower tubular member with a ground-engaging foot telescopically received and slidably mounted in the upper tubular member for upward and downward movement relative thereto; and
    a control arrangement associated with one of the jacks for separately controlling the leveling of both of the jacks, wherein the control arrangement includes a first rotatable crank assembly and a second rotatable crank assembly, wherein the first and second crank assemblies are movably mounted on an upper end of the upper tubular member of one of the jacks for moving the lower tubular members of both of the jacks on opposite sides of the framework upwardly and downwardly independent of each other.

2. The portable bleacher construction of claim 1, wherein the first rotatable crank assembly has a first handle pivotally mounted to a first transfer rod which projects into the upper end of the upper tubular member of a first jack disposed on a first one of the beams, and wherein the second rotatable crank assembly has a second handle pivotally mounted to an elongated transfer rod which extends from the first jack across the framework into the upper tubular member of a second jack disposed on a second one of the longitudinal beams.

3. The portable bleacher construction of claim 2, wherein the upper tubular member of the jack on the first longitudinal beam includes clamp structure engaged with the first handle and the second handle for retaining the first handle and the second handle in an inoperative position when not in use.

4. The portable bleacher construction of claim 3, wherein the first handle and the second handle are disengaged from the clamp structure and pivoted on their respective transfer rods to an operative position after which the handles are separately rotated to turn the transfer rods to effect movement of the lower tubular members against the ground surface.

5. In a portable bleacher construction having a mobile framework for supporting a plurality of bleacher seats thereon and at least one pair of leveling jacks, wherein each pair of jacks are located on opposite front and rear sides of the framework for stabilizing the framework on a ground surface when the framework is stationary, the improvement comprising:
    at least one control arrangement located on one side of the framework, wherein each control arrangement is operably interconnected with one of the pairs of jacks and is constructed and arranged to operate each jack in the pair of jacks from one side of the framework, and wherein each control arrangement includes a pair of side-by-side manual crank assemblies mounted to an upper end of one of the jacks in each pair of jacks, each of the manual crank assemblies having a handle which is pivotable about a first horizontal axis extending generally parallel to a longitudinal axis defined by the framework, and is rotatable about a second horizontal axis extending generally perpendicularly to the first horizontal axis, and wherein each control arrangement further includes an input shaft interconnected with one of the manual crank assemblies, wherein a first one of the input shafts provides a rotary input to the jack to which the crank assemblies are mounted, and wherein a second one of the input shafts extends across the framework and provides a rotary input to the other jack in the pair of jacks.

6. A method of stabilizing and leveling a portable bleacher construction having a mobile framework defining first and second sides and supporting a plurality of bleacher seats, comprising the steps of:
    mounting at least one pair of jacks to the framework such that a first one of the jacks is located on one side of the framework and a second one of the jacks is located on an opposite side of the frame; and
    operating both jacks in the pair of jacks from one side of the framework by operation of a jack actuation arrangement located on one side of the framework, wherein the jack actuation arrangement includes a pair of operating handles located on one side of the framework, wherein a first one of the handles provides input power through an input member interconnected with the jack on the same side of the framework as the actuating arrangement, and wherein a second one of the handles is interconnected with a rotary input member which extends across the framework and provides rotary input power to the other jack in the pair of jacks.

7. A portable bleacher construction comprising:
    a wheeled framework for supporting a plurality of bleacher seats thereon in a mobile travel condition and a stationary seating condition;
    at least one pair of leveling jacks located on opposite sides of the framework for stabilizing the framework in the seating condition upon a ground surface, wherein each of the jacks has an upper tubular member fixed to the framework, and a lower tubular member with a ground-engaging foot telescopically received and slidably mounted in the upper tubular member for upward and downward movement relative thereof; and,
    a control arrangement associated with the jacks for separately controlling the leveling of both of the jacks from a common location, wherein the control arrangement includes a first rotatable crank assembly and a second rotatable crank assembly, wherein the first and second crank assemblies are movably mounted on a common side of the framework for moving the lower tubular members of both of the jacks on opposite sides of the framework upwardly and downwardly independent of each other.

8. A method of stabilizing and leveling a portable bleacher construction having a mobile framework supporting a plurality of bleacher seats, comprising the steps of:
    mounting at least one pair of jacks to the framework such that a first one of the jacks is located on one side of the framework and a second one of the jacks is located on an opposite side of the frame; and,
    operating both jacks in the pair of jacks from a common side of the framework by operation of a jack actuation arrangement located on said common side of the framework, wherein the jack actuation arrangement includes a pair of operating handles located on said common side of the framework, wherein each of the handles provides a separate input power through an input member interconnected with one of the pair of jacks.

* * * * *